United States Patent [19]

Taniguchi et al.

[11] Patent Number: 5,183,726
[45] Date of Patent: Feb. 2, 1993

[54] LIGHT-SENSITIVE RECORDING MEDIUM AND PROCESS FOR PRODUCING SAME

[75] Inventors: Hitoshi Taniguchi; Fumio Matsui, both of Saitama, Japan

[73] Assignee: Pioneer Electronic Corporation, Tokyo, Japan

[21] Appl. No.: 654,445

[22] Filed: Feb. 12, 1991

[30] Foreign Application Priority Data

Sep. 4, 1990 [JP] Japan .................................. 2-233930

[51] Int. Cl.$^5$ .............................................. G11B 7/24
[52] U.S. Cl. .................................... 430/342; 430/335; 430/332; 430/19; 430/962; 430/495; 430/945; 430/343; 346/135.1
[58] Field of Search ................. 430/342, 332, 19, 962, 430/495, 945, 335, 343; 346/135.1; 369/275.2; 252/586

[56] References Cited

U.S. PATENT DOCUMENTS 4,182,629 1/1980 Helles ..................................... 430/338
4,837,063 6/1989 Irie .......................................... 428/64

FOREIGN PATENT DOCUMENTS 64-087684 3/1989 Japan ..................................... 430/962

OTHER PUBLICATIONS

English Language Abstract of JP 62-280264, Dec. 1987, Irie.

*Primary Examiner*—Charles L. Bowers, Sr.
*Assistant Examiner*—John A. McPherson
*Attorney, Agent, or Firm*—Sughrue, Mion, Zinn, Macpeak & Seas

[57] ABSTRACT

A light-sensitive recording medium using a photochromic material produced at a low cost, without necessity of fixing free rotation of bonds in its cis compound and removing its trans compound, is disclosed, the recording medium comprising a substrate having thereon a recording layer which contains a photochromic material capable of cis-trans isomerization upon irradiation with light, wherein not more than 50 mol % of the photochromic material has a trans configuration when the recording layer is in a color-disappearing state.

5 Claims, 1 Drawing Sheet

1

LIGHT-SENSITIVE RECORDING MEDIUM AND PROCESS FOR PRODUCING SAME

FIELD OF THE INVENTION

This invention relates to a light-sensitive recording medium having a recording layer containing as an essential component a photochromic material and being capable of recording and erasing information utilizing color change of the photochromic material and to a process for producing the light-sensitive recording medium.

BACKGROUND OF THE INVENTION

Photochromic materials are utilized in various fields, e.g., for displays, filters for adjusting an amount of light, devices for measuring an amount of light, recording media for photogrphic printing, paint, and the like.

Recently, photochromic materials have drawn attention in the field of light-sensitive recording media suitable for laser beam since they are expected to function as a reversible memory medium for high density recording.

When a photochromic material is used in a recording layer, recording is effected in such a manner that the recording layer in the color-disappearing state is exposed to light having a certain wavelength to convert into its color by way of shifting the absorption peak within a visible light region as shown in FIG. 2. For example, a diarylethene derivative exhibits such a coloring/color-disappearing phenomenon by the ring cleavage/ring closure reaction as shown below.

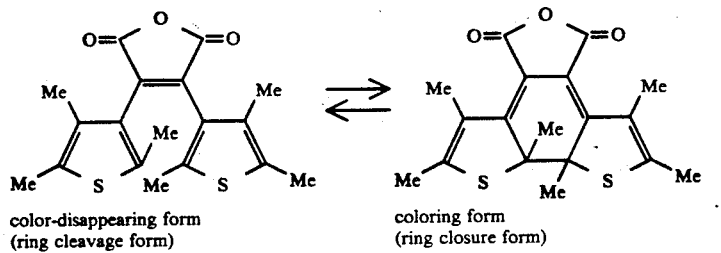

color-disappearing form
(ring cleavage form)

coloring form
(ring closure form)

The diarylethene derivative exhibiting the coloring-/color-disappearing phenomenon is synthesized via an intermediate, 1,2-di(2,4,5-trimethyl-3-thienyl)-1,2-dicyanoethene. The intermediate contains the following stereoisomers (cis-trans isomers):

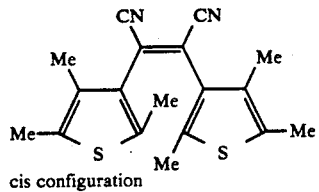

cis configuration

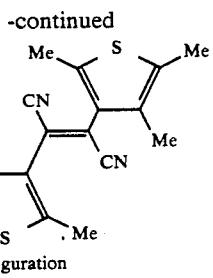

trans configuration

It is known to produce the above photochromic material by removing the trans compound which does not contribute to the coloring/color-disappearing phenomenon, and reacting only the cis compound with an acid anhydride to prevent free rotation of bonds in the molecule. However, the fixation of free rotation and the separation of the trans compound make the production process complicated and the yield of the photochromic material is increased only with difficulty. Thus, a production cost of the material cannot be lowered.

SUMMARY OF THE INVENTION

An object of this invention is to provide a light-sensitive recording medium using a photochromic material produced at a low cost without necessity of fixing the free rotation and removing such a trans compound.

As a result of extensive study for eliminating the above-described problems, it has been found that the object can be attained by a light-sensitive recording medium comprising a substrate having thereon a recording layer which contains a photochromic material capable of cis-trans isomerization upon irradiation with light, wherein not more than 50 mol % of the photochromic material has a trans configuration when the recording layer is in a color-disappearing state.

DETAILED DESCRIPTION OF THE INVENTION

Recording of information is carried out by irradiating the recording layer in the color-disappearing state of the light-sensitive recording medium with light having a certain wavelength, and erasing is effected by converting the coloring state of the recording layer into the color-disappearing state.

Figure 1:
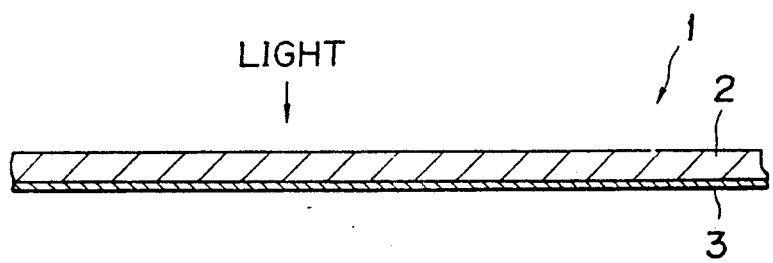
FIG. 1 is a partial sectional view of a light-sensitive recording medium of this invention.
Figure 2:
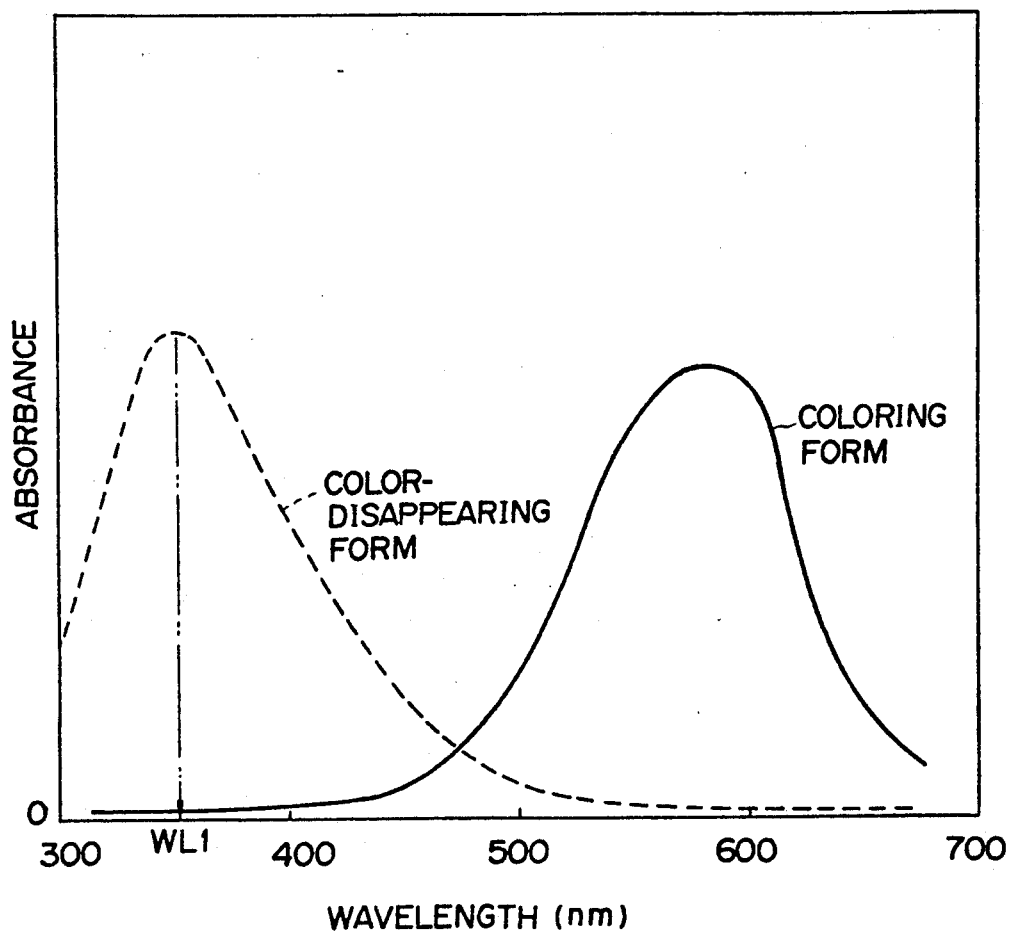
FIG. 2 is a graph showing the relationship between absorbance and wavelength of the absorption peak of a recording layer in the color-disappearing state and in the coloring state, respectively, of the light-sensitive recording medium.

One embodiment of the light-sensitive recording medium of this invention has a partial sectional view as shown in FIG. 1, wherein a light-sensitive recording medium 1 has a recording layer 3 on a substrate 2. The recording layer 3 is generally irradiated with light through the substrate to record information when the substrate is transparent.

The recording layer contains a photochromic material exhibiting color change by way of, for example, the conversion of color-disappearing form (ring cleavage form) into coloring form (ring closure form) when irradiated with light having a certain wavelength. The photochromic material used in this invention is a recording material capable of cis-trans isomerization. Examples of the recording material include diarylethene type organic compounds such as 1,2-di(2,4,5-trimethyl-3-thienyl)-1,2-dicyanoethene, 1,2-di(2-methyl-3-benzothienyl)-1,2-dicyanoethene, 1,2-di(2,4,5-trimethyl-3-thienyl)dimethyl maleate, and the like.

While the photochromic material in the recording layer includes those having cis and trans configurations, the trans compound is included in the proportion of not more than 50 mol % and preferably from 5 to 30 mol % when the recording layer is in the color-disappearing state. If the proportion exceeds 50 mol %, the resulting recording layer fails to exhibit satisfactory color change in practical use because of lack of the cis compound which can have the ring closure structure to cause coloration.

The recording layer of this invention generally contains from about 1 to about 50 wt % of the photochromic material and from about 50 to about 99 wt % of a binder such as polystyrene, polymethylmethacrylate, polyvinyl chloride, and the like. The thickness of the recording layer is generally from about 0.1 to about 20 micron meter ($\mu$m).

The light-sensitive recording medium of this invention may have one or more of known layers between the recording layer and the substrate or on the recording layer.

Then, a process for producing the light-sensitive recording medium of this invention is explained in detail below.

First, a photochromic material capable of cis-trans isomerization upon irradiation with light is mixed with a binder to prepare a coating composition for a recording layer. The coating composition is then coated on a substrate, for example, by a spin-coating method, and dried. The thus formed recording layer is exposed to light of the ultraviolet region having a wavelength of from about 360 to about 460 nm for a long time (e.g., about 10 to 100 minutes), so that the recording layer is allowed to be in the coloring state. Subsequently, the recording layer is exposed to a visible light having a wavelength of from about 500 to about 600 nm for about 10 to 100 minutes to cause conversion of the coloring state into the color-disappearing state (so-called "initialization" of the recording layer), whereby the light-sensitive recording medium of this invention is produced.

The photochromic material used in the above-described process may be a cis compound or a trans compound alone or may be a mixture thereof. In either case, proportion of the trans compound in the photochromic material becomes almost constant upon irradiation of the recording layer with light.

Instead of the irradiation with light for a long time for coloration in the above process, irradiation with light for coloration and irradiation with light for color disappearance may be alternatively repeated several times, so that the recording layer comes to a light-steady state at which proportion of the trans compound to the cis compound present in the photochromic material becomes almost constant.

This invention is further explained in detail with reference to the following example, but the invention should not be construed as being limited thereto.

EXAMPLE

Four kinds of diarylethene derivatives (A1), (A2), (B1), and (B2) having the following structures were used as a photochromic material capable of cis-trans isomerization with light, wherein the compounds (A1) and (A2), and the compounds (B1) and (B2) are cis-trans steroisomers, respectively.

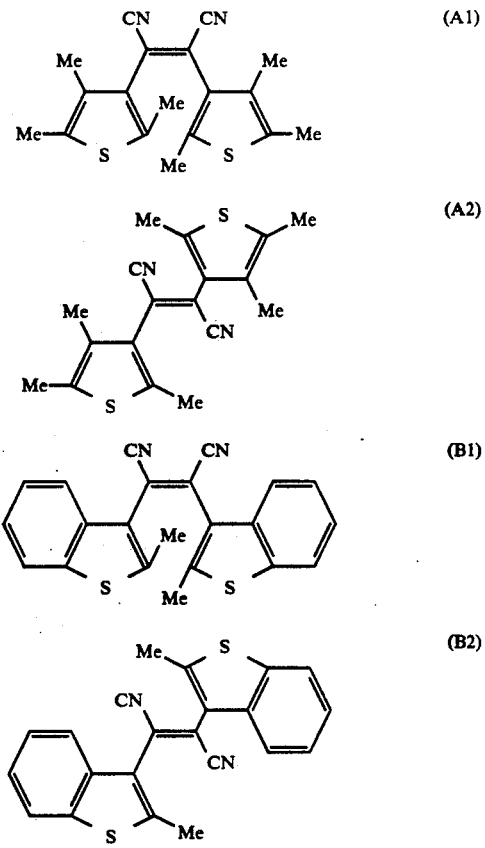

In the above formulae, "Me" is a methyl group.

Each of the four compounds was mixed with polystyrene (binder) to prepare a coating composition having the binder content of 90 wt %. The coating composition was then coated on a cast-molded polymethylmethacrylate resin substrate (diameter 130 mm) by a spin-coating method and dried, whereby a light-sensitive recording medium having a 5 $\mu$m thick recording layer was produced.

The recording layer formed on the substrate was irradiated with light having a wavelength of 420 nm for 20 to 50 minutes to cause coloration. After the recording layer came to a light-steady state, the recording layer was further irradiated with light having a wavelength of 560 nm for 20 to 50 minutes to cause color disappearance (i.e., initialize).

In the preparation of each initialized light-sensitive recording medium, the configuration of the photochromic material in the recording layer at the light-steady state after the irradiation with light of 420 nm and 560 nm, respectively, was examined in the following manner. The polystyrene binder in the recording layer was dissolved in methylene chloride and the residue, namely the photochromic material, was analyzed with a high performance liquid chromatography to measure the proportions of the trans compound, the cis compound having the ring cleavage structure. The results are shown in Table 1.

TABLE 1

| Compound | Wavelength of light irradiated (nm) | Cis compound with ring cleavage | Proportion (mol %) Trans compound | Cis compound with ring closure |
|---|---|---|---|---|
| A1 | 420 | 22.8 | 7.0 | 70.2 |
|    | 560 | 92.8 | 7.2 | 0 |
| A2 | 420 | 21.5 | 6.5 | 72.0 |
|    | 560 | 93.4 | 6.1 | 0.1 |
| B1 | 420 | 42.9 | 29.9 | 27.2 |
|    | 560 | 70.6 | 28.9 | 0.5 |
| B2 | 420 | 42.9 | 29.3 | 28.1 |
|    | 560 | 69.8 | 29.6 | 0.6 |

It is seen from the results shown in Table 1 that:

(i) Regardless of the cis compound (A1) or (B1), or the trans compound (A2) or (B2) used in preparation of the light-sensitive recording medium, the proportion of the trans compound in the recording layer is almost constant at the light-steady state, and it depends only on the molecular skelton of the photochromic material. The same results were obtained in the case of using the photochromic material in the form of a mixture of the cis and trans compounds.

(ii) The proportion of the trans compound in the recording layer does not substantially change between the states after irradiation with light of 420 nm (i.e., the coloring state) and after irradiation with light of 560 nm (i.e., the color-disappearing state), and it is evident that the trans compound does not contribute to and influence on the coloring/color-disappearing phenomenon of the light-sensitive recording medium of this invention.

The initialized light-sensitive recording media as prepared above were subjected to a writing test using light having a wavelength of 420 nm. As a result, each recording medium was able to record information efficiently.

While the invention has been described in detail and with reference to specific embodiments thereto, it will be apparent to one skilled in the art that various changes and modifications can be made therein without departing from the spirit and scope thereof.

What is claimed is:

1. A light-sensitive recording medium comprising a substrate and a recording layer formed thereon, wherein said recording layer contains a photochromic material capable of cis-trans isomerization upon irradiation with light, and not more than 50 mol % of the photochromic material has a trans configuration when the recording layer is in a color-disappearing state which is formed by irradiating the recording layer with light having a wavelength of 360 to 460 nm to cause coloration of the recording layer and then irradiating the recording layer with light having a wavelength of 500 to 600 nm to cause color disappearance in the recording layer.

2. A light-sensitive recording medium as in claim 1, wherein 5 to 30 mol % of the photochromic material has a trans configuration when the recording layer is in a color-disappearing state.

3. A light-sensitive recording medium as in claim 1, wherein the photochromic material is 1,2-di(2,4,5-trimethyl-3-thienyl)-1,2-dicyanoethene, 1,2-di(2-methyl-3-benzothienyl)-1,2-dicyanoethene, or 1,2-di(2,4,5-trimethyl-3-thienyl)dimethyl maleate.

4. A light-sensitive recording medium as in claim 1, wherein the recording layer contains the photochromic material in an amount of 1 to 50 wt %.

5. A light-sensitive recording medium as in claim 1, wherein the recording layer has a thickness of 0.1 to 20 micron meter.

* * * * *